Feb. 17, 1970    A. D. GRONNER    3,496,436
TORQUE-TYPE SERVO REBALANCING SYSTEM
Filed July 16, 1965

INVENTOR
ALFRED D. GRONNER

United States Patent Office 3,496,436
Patented Feb. 17, 1970

3,496,436
TORQUE-TYPE SERVO REBALANCING SYSTEM
Alfred D. Gronner, White Plains, N.Y., assignor to Simmonds Precision Products, Inc., Tarrytown, N.Y., a corporation of New York
Filed July 16, 1965, Ser. No. 472,520
Int. Cl. G05b 5/00
U.S. Cl. 318—18                               1 Claim

ABSTRACT OF THE DISCLOSURE

A self-rebalancing servo system utilizing a torque type armature coil indicator for driving a potentiometer for producing a feedback voltage for balancing the input voltage to an amplifier.

---

This invention relates to servo rebalancing systems, and, more particularly, to a simple torque-type self-balancing servo indicator system which utilizes the feedback from a potentiometer and a damping coil to the input of an error amplifier.

Presently, servo systems utilizing a conventional motor gear train potentiometer combination are employed with bridge balancing networks wherein the bridge is adapted to compare a reference signal with a measuring signal furnished by a measuring transducer and wherein a resultant signal proportional to the difference of the two is amplified and then caused to operate the motor gear train and potentiometer combination for restoring the bridge to balance. One significant disadvantage with this type of system is its considerable weight and size which prohibits its use in aerospace applications. Further, aerospace applications place a premium on such factors as low power consumption, a high degree of reliability and a high response speed. These factors are sacrificed in large complicated systems as described above and it is only when simplicity in design is achieved that such factors can be realized.

Accordingly, it is an object of this invention to provide a simplified servo rebalancing unit which is small in size, light in weight and exhibits increased reliability, a high response speed and a power consumption of less than .5 watts for a .1% to .2% sensitivity.

It is another object of this invention to provide a simplified servo rebalancing unit which can find application as an indicator in any self-balancing systems, such as temperature bridges, Wheatstone bridges, etc. and further as a multiplier or divider for industrial control applications.

It is yet another object of this invention to provide a simplified servo rebalancing unit which can be utilized as a vibration-resistant accurate DC or AC voltmeter.

According to one embodiment of the system utilizing the principles of this invention there is provided an amplifier having a DC output which drives a torque coil indicating device. The torque device drives a potentiometer which produces a feedback voltage for balancing out the input voltage to the amplifier. The torque device itself achieves a movement of ±60° with a torque of 2 to 3 oz. inches utilizing as little as .5 watt in the coil of the torque unit.

A better understanding of the invention will be had after reading the following detailed description with reference to the appended drawings in which.

Figure 1:
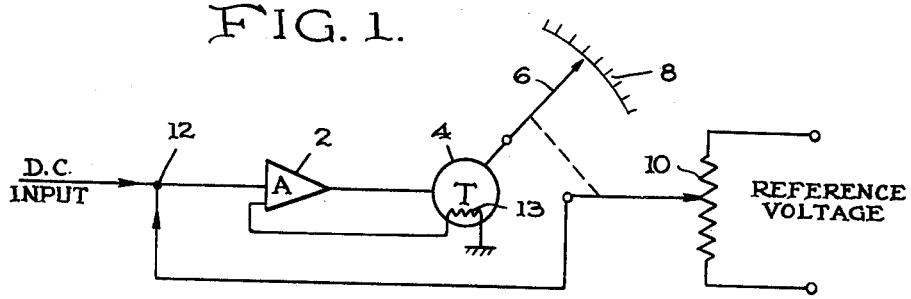
FIG. 1 is a schematic diagram illustrating the basic circuitry of the servo system and its application as a DC voltmeter.

Referring now to FIG. 1, there is shown the basic circuit for the servo rebalancing unit employing the principles of this invention. Generally a DC voltage input is applied to an amplifier 2 which provides an output for driving the torquer device 4 and its associated indicator arm 6. The arm 6 operates as a wiper for potentiometer 10 which produces a feedback voltage for balancing out the input voltage.

A damping voltage is developed across a damping coil 13 in the torquer 4 whenever the arm 6 moves. This voltage is used in the amplifier to stabilize the servo system.

Figure 2:
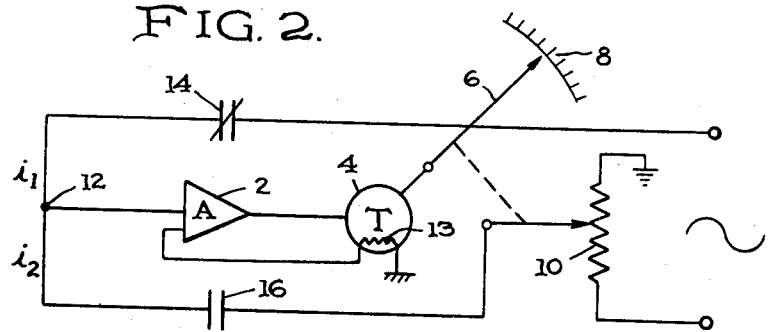
FIG. 2 is a schematic diagram illustrating the application of the servo system as a capacitance indicator for fuel gauges employing balancing bridge circuits.

In FIG. 2 the servo rebalancing unit is shown to function as a capacitance indicator for a fuel measurement system or other capacitive-type transducer measuring systems. Generally in this type of rebalancing bridge-type of capacitance gauge a measuring condensor 14 having spaced electrodes is immersed in the fluid in a suitable container (not shown) and its change in capacitance with change in liquid level is employed to control an indicator. For this purpose the measuring condensor 14 is connected in one arm and a reference condensor 16 is connected in an opposing arm of a bridge circuit in which a pair of alternating current voltage sources constitute the other two arms. A phase sensitive detector amplifier 2 responsive to the bridge output at junction 12 is coupled to the torquer device 4 to produce a DC curernt therein proportional to the difference between $i_1$ and $i_2$ at the junction point 12. The resultant current energizes the torquer device causing the indicator arm 6 to rotate. Because the arm 6 operates as a wiper for potentiometer 10 the voltage applied to the reference condensor 16 is varied in accordance with the signal applied to the torquer 4 thereby maintaining bridge balance.

Figure 3:
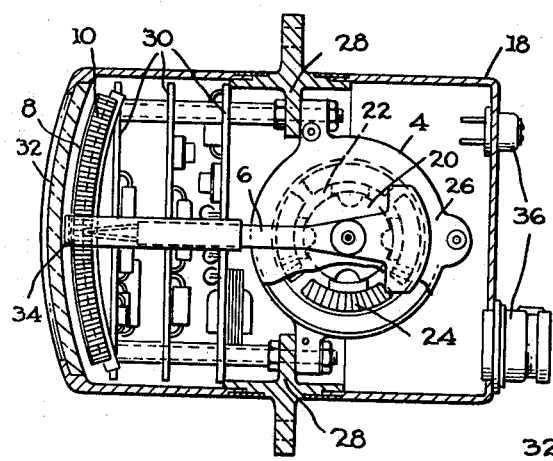
FIG. 3 is a plan view of the servo system unit showing the arrangement of the torquer, potentiometer and amplifier components.
Figure 4:
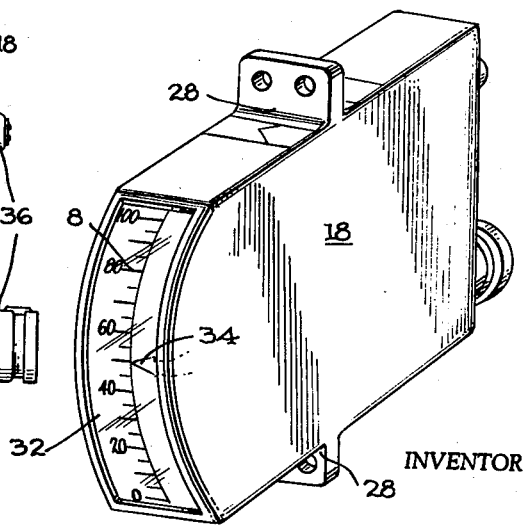
FIG. 4 is a perspective view of the servo rebalancing unit in its electroformed case.

In FIG. 3 the amplifier torquer and potentiometer combination are shown assembled in an electroformed case 18. The torquer itself consists of an Alnico permanent magnet rotor 20 rotating inside a stator 22 with its associated coil windings 24. Movement of ±60 with a torque of 2 to 3 oz. inches is achieved using .5 watt in the coil of the torquer unit. The damping coil 13, not shown, should be positioned in close proximity to the permanent magnet rotor 20 such that movement of the rotor will cause a change in flux across the coil thereby developing a damping voltage as explained above. A glass-filled nylon casing 26 houses the magnet and stator windings. Through an aperture in the top of the housing 26 a counterweighted pointer 6 is affixed to the center of the magnet 20 as by suitable bushing means. The casing 26 is secured to the support flanges 28 by suitable support means. Pointer 6 terminates into a flexible spring wire which is biased against the potentiometer 10 and adapted to operate as a potentiometer wiper. The rebalance potentiometer 10 is curved to accommodate the arc traced by the pointed 6. Adjacent the convex side of the potentiometer is a dial scale 30 beneath a glass cover 32 provided on the front face of the housing 18. An indicator extension 34 is secured to the end of the pointer 6 for providing readings on the dial face 32. The housing is further provided with hermetically sealed receptacle units 36 for accommodating the appropriate wiring for the torquer device.

Low power consumption, small size and weight make this invention highly suitable for use in manned spacecraft. Normally many D'Arsonval type of instruments find application in small aircraft use and when low torque available in a standard D'Arsonval movement requires the use of precision jewel bearings, which sometimes fail in a harsh aerospace operating environment, the much higher torque of 2 to 3 oz. inches displayed by the device according to this invention makes it possible to use relatively inexpensive and rugged sleeve bearings. The significant feature in combination with the considerably fewer parts required makes the device according to this invention as reliable as a servo system indicator and considerably more reliable than a standard D'Arsonval movement.

Although several embodiments of the invention have been depicted and described, it will be apparent that these embodiments are illustrative in nature and that a number of modifications in the apparatus and variations in its end use may be effected without departing from the spirit or scape of the invention as defined in the appended claim.

That which is claimed is:

1. In a servo rebalancing unit, a first bridge circuit having a first component of current responding to a signal furnished by a transducer measuring means coupled in an arm thereof, a second bridge circuit having a second component of current including signal responsive means, means for supplying said first and second bridge circuits with energizing alternating voltage, means coupling said first and second bridge circuits to a signal responsive means, variable impedance means for producing a variable component of current in said second bridge circuit, said signal responsive means connected to a coil means, said coil means surrounding a permanent magnetic armature, indicator means connected to said armature and said variable impedance means for adjusting the electrical output of said variable impedance means to vary said variable component in a direction to reduce the difference of said first and second components of current to zero, and a damping coil connected to said signal responsive means and being in proximity to said armature whereby the voltage developed from said damping coil in response to movement of said indicating means is used to stabilize said servo rebalancing unit.

References Cited

UNITED STATES PATENTS

| | | | |
|---|---|---|---|
| 1,757,193 | 5/1930 | Hotopp | 324—125 |
| 2,073,948 | 3/1937 | Schofield | 318—28 XR |
| 2,144,865 | 1/1939 | Wilson | 318—28 XR |
| 2,906,937 | 9/1959 | Umrath | 318—448 |
| 2,915,695 | 12/1959 | Zimmerli | 318—448 XR |
| 2,968,180 | 1/1961 | Schafer | 318—29 XR |
| 3,323,054 | 5/1967 | Yasui | 324—125 XR |

B. DOBECK, Primary Examiner

U.S. Cl. X.R.

324—125